United States Patent Office 3,226,817
Patented Jan. 4, 1966

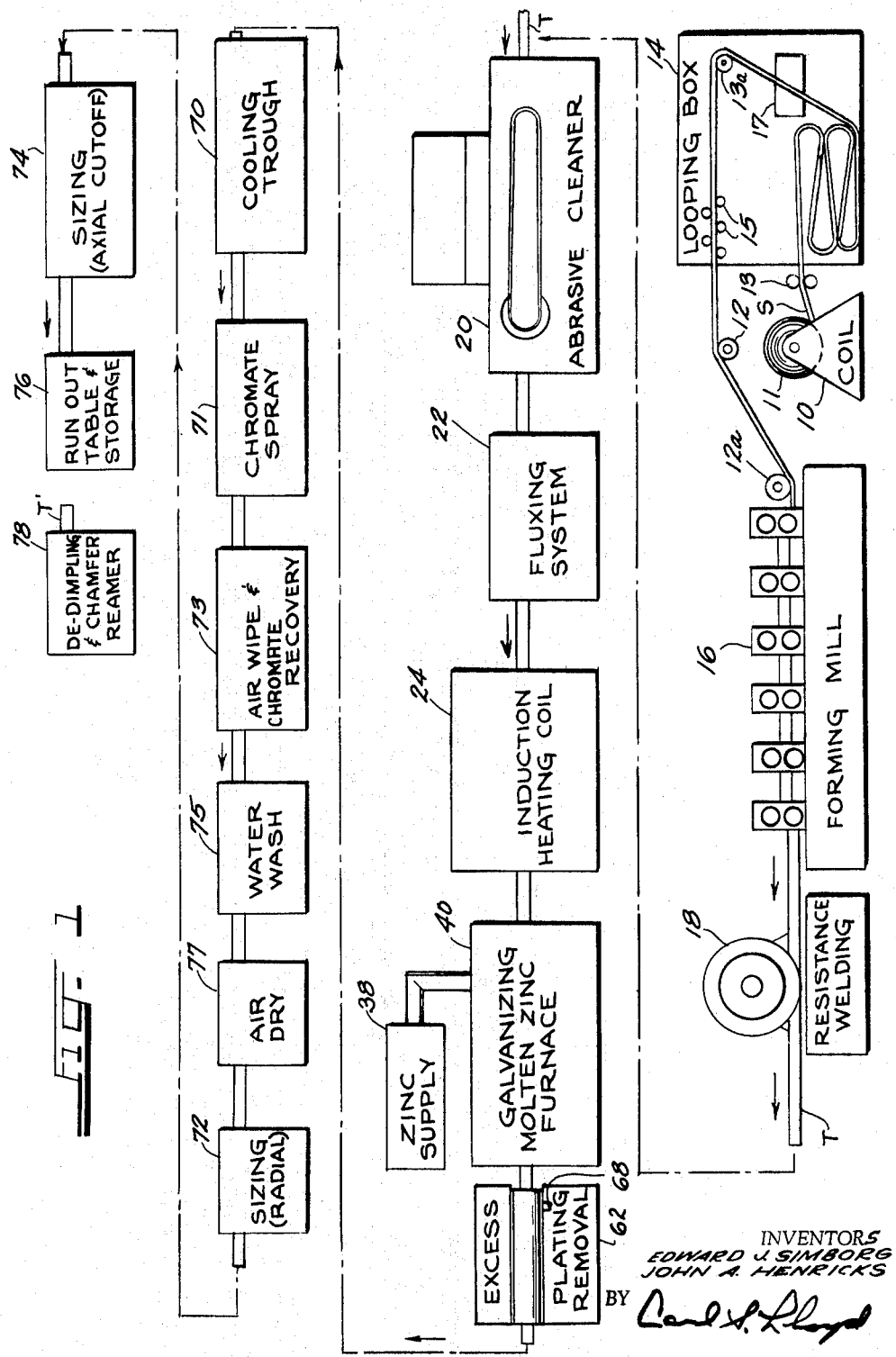

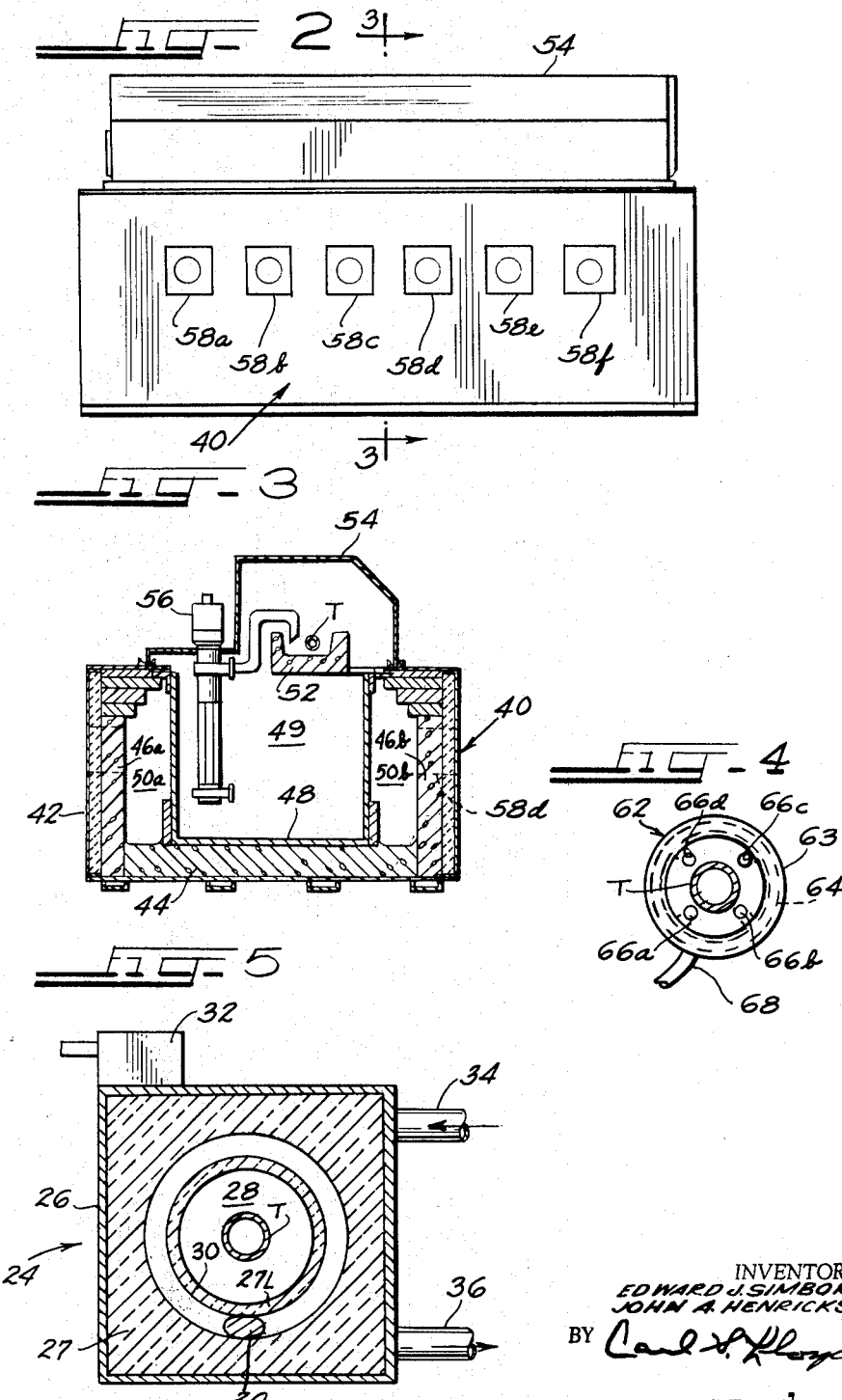

3,226,817
CONTINUOUS METHOD FOR FABRICATING TUBING
Edward J. Simborg, Chicago, and John A. Henricks, Oak Park, Ill., assignors to International Nikoh Corporation, Chicago, Ill., a corporation of Illinois
Filed Apr. 17, 1963, Ser. No. 273,711
2 Claims. (Cl. 29—430)

This invention relates to the manufacture of exteriorly coated welded steel tubing and more particularly to a continuous process for fabricating welded steel tubing which is provided with a coating such as galvanized zinc, aluminum, copper, and the like.

In the described embodiment, the invention is illustrated by the formation of lengths of welded steel tubing of predetermined axial and radial dimensions and having a uniform galvanized coating by means of a molten zinc application. The tubing is formed from wound flat stock which is carried off of a coil storage drum through a looping storage system, such that a new coil may be attached to the end of a depleted or processed coil in a continuous manner. The stock which is thus continuously fed from the loop storage system is chemically cleaned and degreased and is formed into the desired tubular configuration by progressive die bending of the stock, followed by a suitable welding operation to seal the produced seam in the tubular configuration (although other shapes such as square, oval, hexagon, octagon, and other cross sections may be formed if desired). The exterior of the tube so formed is then exteriorly cleaned and roughened by abrasive impaction. The continuous tube length is then passed through a flux bath, after which it is preheated by passage through the interior of a suitably insulated induction heating coil. The heated continuous tube length is then passed through a specially treated molten zinc bath for application of the galvanized coating and through an excess plating removal system which standardizes the dimensions of the applied coating. The coated tube length is then cooled and dimension stabilized, first by a radial sizing and then by an axial sizing to produce the desired individual lengths of coated tubing. The cut-off individual lengths of tubing are then suitably gathered and stored for a subsequent individualized reaming action so as to de-dimple and chamfer the ends of the formed tubes. Further according to the practice of the invention, the plated tube is chromated by a continuous spray technique whereby corrosion is substantially minimized.

In general, the objects of this invention are to provide a novel and superior continuous method for making corrosion resistant welded steel tubing, which method features improved overall mechanical handling of the uncoated and coated tubing; chemical cleaning and degreasing prior to welding of the tubing; activation of the tubing surface by roughening and fluxing prior to galvanizing; preheating of the tubing prior to galvanizing; galvanizing in a special environment; removing excess galvanizing material; and chromating the coated tubing for corrosion resistance.

It is a primary object of this invention to provide a continuous method for making welded steel tubing which is suitably cleaned, fluxed, and preheated for introduction into a molten zinc coating system and which is dimension stabilized and cooled for subsequent handling, such as an axial cut-off to appropriate lengths for storage and use.

It is a further object of this invention to preheat the welded tubing by passage of the tubing through the interior of an induction heating coil prior to its entry into a molten zinc coating bath and to remove excess coated material while in a molten state by a countercurrent gaseous blast procedure.

It is a still further object of this invention to clean the welded steel tubing prior to fluxing and preheating by abrasive impaction, so as to insure a retained and serviceable galvanized coating.

These and other objects, advantages, and features of the subject invention will hereinafter appear, and for purposes of illustration, but not of limitation, an exemplary embodiment of the subject invention is schematically represented in the appended drawings, in which:

FIGURE 1 is a schematic flow diagram showing a tube-forming arrangement suitable for carrying out the subject invention;

FIGURE 2 is a front elevational view of a controlled atmosphere galvanizing furnace which may be utilized in the sequence shown in FIGURE 1;

FIGURE 3 is a sectional view taken along the line 3—3 of FIGURE 2;

FIGURE 4 is a schematic sectional view showing a preferred means for excess plating removal; and FIGURE 5 is a schematic sectional view showing a preferred means for preheating the tubing by interior passage through an induction heating coil.

With reference to the drawings, a flat steel strip S of AISI 1010, AISI 1020, AISI 1008 steel or the like, is shown coiled on a coil drum 10, as indicated by the reel 11. A variable speed pinch or pulling roller system 13 pulls the coiled strip S into a looping box storage system 14, in which the strip S is temporarily detoured from its primary left-hand movement shown by the arrow in FIGURE 1. The strip S is passed over an idler roller 13a and through a series of adjustable straightening rollers 15, as it leaves the looping box storage system 14. The system 14 is provided so that a fresh reel 11 may be positioned on the coil drum 10 after depletion of a given reel. The trailing edge of the depleted reel and the leading edge of the fresh reel are suitably joined together, as by welding, so that a bending die roller mill 16 (through which the strip S is passed via the idler rollers 12 and 12a) senses only a continuous length of steel strip S passing therethrough.

While the strip S passes through the storage system 14, it is subjected to a special chemical treatment for cleaning and degreasing in a bath 17. In a preferred practice, this chemical treatment comprises the utilization of a free rinsing synthetic mild detergent system which is caustic and silicate free and which is buffered to a pH range of 4–8 by the use of a borax and polyphosphate base.

Heretofore, degreasing and cleaning in tubing processes of the nature described herein have been accomplished either by conventional caustic alkali cleaning methods or by a high temperature oxidation cleansing. The presence of strong alkalis is undesirable in that such compounds tend to promote copper oxide formation at welding electrodes, as well as paint bond failure on the tubing surface due to strong alkali residues. The borax-polyphosphate detergent cleaning system above-identified may comprise the following ingredients in relative parts by weight:

Borax _____ 25–35
Boric acid _____ 5–15
Tetrasodium pyrophosphate _____ 25–35
Sodium bicarbonate _____ 5–15
Sodium sulfate _____ 7–20
Polyoxyethylated lauryl alcohol _____ Up to 8
Sodium xylene sulfonate _____ Up to 5
Sodium octyl sulphate ester _____ Up to 5

The borax serves as a welding flux and as a lubricant; the tetrasodium pyrophosphate serves as a sequestering agent; the borax-boric acid and the sodium bicarbonate serve as buffers; and the sodium sulfate coacts with the non-ionic detergent (polyoxyethylated lauryl alcohol), the hydrotrope (sodium xylene sulfonate) and the aionic wetting agent (sodium octyl sulphate ester) to form a free rinsing mild synthetic detergent system. Substitution of chemical equivalents can of course be effected in the described formulation.

A specific rinsing and degreasing system which has been found suitable is as follows on a relative parts by weight basis:

| | |
|---|---|
| Borax | 30 |
| Boric acid | 10 |
| Tetrasodium pyrophosphate | 28 |
| Sodium bicarbonate | 8 |
| Sodium sulfate | 14 |
| Polyoxyethylated lauryl alcohol | 4 |
| Sodium xylene sulfonate | 3 |
| Sodium octyl sulphate ester | 3 |

Three to six ounces of the foregoing combinations of dry ingredients per gallon of water when heated to about 140° F. yields a slightly alkaline (pH about 8) silicate and caustic free detergent system which is effective in the practice of the subject invention.

The mill 16, which pulls the strip S out from the system 14 via the idler rollers 12 and 12a, progressively bends the strip S until a generally tubular cross-sectional configuration is achieved. The tube so formed is then sealed along its longitudinal seam as by a resistance welding apparatus 18.

The formed tubing T is then passed to the abrasive cleaner system 20, in which it is subjected to an atmosphere of fluidized abrasive particles which continuously impact the exterior surface of the tubing T so as to suitably clean and prepare the surface for subsequent coating. The abrasive cleaning system has been found most satisfactory for the proper adherence of the galvanized zinc coating, hereinafter described. A suitable apparatus for this phase of the operation is a commercially available unit produced by the Wheelabrador Company, South Bend, Indiana, and designated by the trademark "Wheelabrador."

The described abrasive impaction feature suitably roughens the iron surface for subsequent adherence of the galvanizing coating. Heretofore, such roughening was conventionally accomplished by a deep acid pickle or by an in situ reduction of iron oxide scale to a finely divided residue of reduced iron powder. It has now been found that the described abrasive impaction achieves the desired roughening of the iron surface in a superior fashion as compared to prior art practices. The tubing emerging from the abrasive cleaning system 20 is covered with a fine layer of abraded iron and fragmented shot particles which layer apparently aids in the formation of an interfacial iron-zinc bonding layer by reaction with an acid flux system as hereinafter described.

From the abrasive cleaning system 20, the tubing T then passes through the fluxing system 22, in which a suitable flux is applied to the exterior of the tubing T. The said flux is an acidulated iron-zinc chloride composite. A suitable example is as follows, on a relative parts by weight basis:

| | |
|---|---|
| Zinc chloride | 35–70 |
| Ammonium chloride | 0.5–25 |
| Iron chloride | 1–50 |
| Water | Balance |

Hydrochloric acid (sufficient to yield a pH range between 1.0–2.0).

A preferred flux utilizes a 50:5:5 ratio of zinc:ammonium:iron chlorides.

The presence of iron chloride in the acid flux serves to chemically produce an interfacial iron-zinc bonding alloy. In prior art practices, such an alloy has been formed by thermal diffusion requiring several minutes immersion of the iron work in a molten zinc bath. However, the described iron chloride containing acid flux provides for the presence of active iron in the iron-zinc interfacial zone such that a few seconds contact time with a molten zinc bath is sufficient to form the desired interfacial bonding alloy. The described iron-chloride can be formed either through the reaction of free hydrochloric acid in the flux system with the iron surface; by the decomposition of the ammonium chloride against the hot iron surface of the tubing; or by the intentional addition of the iron chloride in the flux bath as previously indicated. In fact, combinations of these various procedures can be utilized. Apparently, the iron chloride in the flux layer is rapidly reduced to active iron by the strongly reducing atmosphere of the molten zinc furnace, as hereinafter described. It should be noted that the iron chloride referred to herein is ferrous chloride, althougha ferric chloride may be utilized if reduced with iron and hydrochloric acid to the ferrous state.

The flux covered tubing is then passed to a preheating system, such as the induction heating coil arrangement as represented schematically by the reference numeral 24 in FIGURE 1. In FIGURE 5 a schematic cross-sectional view of an appropriate apparatus is shown. The apparatus comprises a housing 26, which contains a suitable insulating medium 27, such as sheet bedrock. A longitudinal bore 28 is centrally provided in the insulating medium 27 for passage of the tubing T therethrough. An induction water cooled heating coil 30 is disposed in the longitudinal bore 28 and is retained in position adjacent the insulating medium 27 by a generally cylindrical insulating liner 27L, such that the coil 30 is sandwiched between two concentric insulating media. In this manner, the tubing T may pass through the interior of the heating coil 30 for electrical induction heating thereof without any danger of short-circuiting the coil 30 by virtue of contact of the tubing T with the coil 30. A bus bar 32 is provided for appropriate connection of the induction heating coil 30 with a motor generator (not shown), and, as required, a water cooling system may interlace the induction heating coil arrangement 24, as by the schematically represented water ingress and water egress lines 34 and 36 respectively.

In a typical operation the passage of the tubing T through the interior of an induction heating coil is capable of generating surface temperatures on the exterior of the tubing T in the order of from 500° to 800° F., as the tubing T passes through a 1 to 4 foot length of heating coil at a rate of 30 to 300 feet of tubing per minute. The preferred practice is to operate at a surface temperature in the range of 680° to 800° F., at a 150 feet of tubing per minute rate. The heating so achieved causes the applied flux to generally disperse over and wet the surface of the tubing T so as to assure maximum contact with and retention of the subsequently applied molten zinc. It has been found that the tubing preheating temperature is very important to the successful practice of the subject invention. At a given mill speed (for example, the preferred speed above-indicated), the preheat temperature determines the coating thickness obtained as well as the bonding of the zinc coating to the steel tube. If the tube temperature falls below 680° F., the chloride flux is not fused prior to immersion in the zinc bath, so that as a result the flux must be melted by the molten zinc itself. This reaction chills on a heavier zinc coating which is characterized by an undesirable uniformity. If the preheat temperature runs above 800° F., the flux is "burned" or converted to the cementatious insoluble zinc oxychloride, which interferes with good zinc bonding. In certain instances, it may be desirable to add from 5% to 10% potassium chloride to the flux in order to reduce oxychloride formation. However, in general, operation within the indicated temperature ranges will produce satisfactory results without such additions.

The tubing T is then passed into a galvanizing molten zinc furnace 40 which is continuously provided with a constant level of molten zinc via a zinc supply system 38. In FIGURES 2 and 3, an exemplary furnace 40 is illustrated. The furnace 40 comprises a frame housing 42 which surrounds the generally horizontal refractory liner 44 and the generally vertical refractory liners 46a and 46b. A bath frame or zinc pot 48 is positioned on the interior of the frame housing 42 so as to define the molten zinc containing volume 49 and the oppositely disposed heating chambers 50a and 50b, respectively associated with the refractory liners 46a and 46b. Suitable heating means, such as the burners 58a–f, extend through the furnace 40 so as to heat the zinc containing volume 49 and maintain it at or above about 825° to 900° F., with a range of about 840° to 875° F. being preferred. A refractory weir 52 is positioned above the molten zinc containing volume 49 and is adapted for the passage of the tubing T therethrough. A hood 54 covers the refractory weir 52 and the zinc containing volume 49, and a controlled atmosphere is maintained beneath the hood 54 (by means not shown) so as to prevent oxidation of the molten zinc. A suitable atmosphere is an inert gaseous blanket of nitrogen or of a conventional non-oxidizing exothermic atmosphere. A molten metal pump 56 draws metal from the zinc containing volume 49 and displaces it upwardly into the refractory weir 52, which is gravity induced to maintain a constant volume of molten zinc therein. The zinc supply in the zinc containing volume 49 is, of course, replenished as needed, by a suitable zinc supply system, such as the system 38 shown schematically in FIGURE 1.

It has been found that the addition of aluminum to the zinc bath is a requisite to the achievement of a commercially acceptable product. Without such an aluminum addition, the resultant zinc coating is dull, rough, and irregular. The aluminum content should be held between 0.2% and 0.3%, based upon the weight of the zinc charged to the furnace 40. Aluminum additions have previously been proposed, but such additions have been significantly lower than the range found suitable for the practice of this invention. Likewise, a higher aluminum content than the said range must be avoided, since the high chemical reactivity of aluminum in an acid medium produces a copper sulfate Preece test result that is unsatisfactory. The function of the aluminum addition is believed to be threefold. First, the aluminum prevents the formation of brittle iron-zinc alloys; second, it increases the zinc fluidity for proper application; and third, it produces a much brighter zinc coating than is otherwise obtainable. It should be observed that apparently the aluminum reacts in the furnace (possibly by drossing out or by combining with the flux), since the aluminum content of the resultant galvanized tubing is less than the indicated 0.2%–0.3% range. However, the described addition of 0.2%–0.3% aluminum, based upon the weight of the zinc charged to the furnace 40, should be maintained in order to achieve a commercially acceptable galvanized product.

The exact amount of coated zinc applied to the continuously passed tubing in the manner indicated of course varies dependent upon the conditions of operation. The coating applied may be varied by the rate of passage of the tubing T through the furnace 40, by the depth of the refractory weir 52, by the temperature conditions, etc. Moreover, in the preferred embodiment of the invention, the amount of plating applied to the tubing is controlled by an excess plating removal step, as represented by the reference numeral 62 in FIGURE 1.

In FIGURE 4, a cross-sectional view of a schematic excess plating system 62 is shown. The system 62 generally comprises a slip ring 63 which contains the circular gas conduit 64. The conduit 64 (shown in phantom in FIGURE 4) is connected to a suitable number of jet nozzles, such as the nozzles 66a–d shown in FIGURE 4. Means (not shown) are provided for supplying the conduit 64 and the nozzles 66a–d with pressurized non-oxidizing gas, as through the supply hose or pipe 68. The nozzles 66a–d are preferably oriented such that the jets of gas emitted therefrom are directed countercurrently from the longitudinal direction of movement of the tubing T. In this fashion, the blasts of inert gas emanating from the nozzles serve to wipe excess molten metal from the coated tubing so as to insure a dimensional stability of coated tubing upon solidification of the molten coating.

When the tubing T has been coated as described, it is passed through a cooling trough system 70 wherein the solidification and bonding of the zinc to the base steel tubing is finally effected by a rapid temperature quenching, as in water. The tubing T is then passed into a chromate spray unit 71, in which a suitable solution is spray applied to the exterior of the tubing in order to form a zinc chromate finish, which serves to retard white corrosion formation on the galvanized product. Such a solution which has been found adaptable to the practice of this invention is commercially available under the trademark designation "Heat Bath WR–2," Heat Bath Corporation, Chicago, Illinois. This solution is described in United States Patent No. 2,844,496. The components of this solution comprise the following ingredients in relative parts by weight:

| | |
|---|---:|
| Sulfamic acid | 2–10 |
| Chromic acid | 40–75 |
| Sodium fluoride | 5–20 |
| Sodium nitrate | 2–15 |
| Boric acid | 2–15 |

From six to ten ounces of the foregoing ingredients are added to one gallon of water in order to effect an in situ formation of fluoboric acid at 140°–150° F. About 2 cc. per liter of hydrochloric acid is added as an acid control to give a pH range of 1.2–1.8.

The chromated tubing then passes through the air wipe and chromate recovery unit 73, which acts in conjunction with the chromate spray unit 71 to remove excess coating solution and to recycle the said solution for reuse. The tubing T is then passed through a water wash system 75, after which it is passed through an air dry station 77.

Thereafter the tubing T is fed through suitable dies in the radial sizing system 72 to detail the radial dimensions of the coated tubing to within specified and predetermined tolerance levels. The system may comprise a burnishing roller arrangement to enhance the luster of the galvanized coating. The tubing could at this stage be stored for subsequent usage, as on storage reels or racks, or as illustrated, the tubing T may be axially sized by an appropriate cutting of predetermined lengths as desired in the axial sizing system 74 shown in FIGURE 1. As each length of tubing is thus cut, the individual lengths are processed through a run-out table and storage system 76 for ultimate placement in shipping, storing, or manufacturing facilities. If needed in a particular operation, the individualized lengths of tubing T' may be treated in a de-dimpling and chamfering arrangement 78, such that any deformities or irregularities in the respective ends of the tubes T' occasioned by the axial cut-off operation may be corrected.

While reference herein has been to a molten zinc coating operation, it should be understood that the galvanizing techniques of the present invention are broadly applicable to other coating systems such as zinc alloy coatings on steel tubings. Typical examples of such modified galvanizing techniques include coatings predicated upon aluminum and copper compositions, such as aluminum-zinc, aluminum-sodium-zinc, various conventional copper alloys, and the like. Also, for convenience of description, the nomenclature "tubular," "tube," "tubing," and the like is utilized in the appended claims, although this terminology is intended to encompass any desired cross-sectional configuration into which a flat strip may be formed.

What is claimed is:

1. The method of continuously fabricating galvanized steel tubing which comprises the steps of:
   interconnecting the leading edge of one end of a flat steel stock with the trailing edge of one end of another flat steel stock by passage of the latter through a looping storage system;
   chemically cleaning and degreasing the steel stock with a synthetic detergent system comprising a borax and polyphosphate base;
   forming the continuous length of flat stock thus produced into a tubular configuration;
   welding the abutting edges of the tubular configuration into a longitudinal seam of formed tubing;
   cleaning and fluxing the exterior surface of the formed tubing, the said cleaning including the step of abrasive impaction of the tubing;
   preheating the formed tubing to a range of from 500° F. to 800° F. by passage thereof interiorly of an electrically insulated induction heating coil;
   applying a predetermined thickness of molten zinc to the formed tubing by passage of the tubing through a predetermined level of molten zinc containing 0.2% to 0.3% aluminum and by removing excess molten zinc from the coated tubing by countercurrent gaseous blasts;
   cooling the coated tubing;
   forming a protective zinc chromate finish on the coated tubing; and
   sizing the coated tubing.

2. The method of continuously fabricating galvanized steel tubing which comprises the following steps in sequence:
   interconnecting the leading edge of one end of a flat steel stock with the trailing edge of one end of another flat steel stock by passage of the latter through a looping storage system;
   chemically cleaning and degreasing the steel stock;
   forming the continuous length of flat stock thus produced into a tubular configuration;
   welding the abutting edges of the tubular configuration into a longitudinal seam of formed tubing;
   cleaning the exterior surface of the tubing by abrasive impaction thereof;
   fluxing the exterior surface of the abraded tubing;
   preheating the tubing to a range of from 500° F. to 800° F. by passage thereof interiorly of an induction heating coil;
   applying a predetermined thickness of molten zinc to the exterior of the tubing by passage of the tubing through a predetermined level of molten zinc;
   removing excess molten zinc from the zinc coated tubing by continuous countercurrent gaseous blasts;
   cooling the zinc coated tubing;
   forming a protective finish on the zinc coated tubing; and
   sizing the zinc coated tubing.

References Cited by the Examiner

UNITED STATES PATENTS

| | | | |
|---|---|---|---|
| 1,012,048 | 12/1911 | Armstrong | 117—52 |
| 1,124,727 | 1/1915 | Greenfield | 118—63 |
| 1,687,309 | 10/1928 | Pritchard | 118—63 |
| 2,011,135 | 8/1935 | Austin | 117—52 |
| 2,197,622 | 4/1940 | Sendimir | 117—51 |
| 3,122,114 | 2/1964 | Kringel et al. | 29—200 |

WHITMORE A. WILTZ, *Primary Examiner.*

THOMAS H. EAGER, *Examiner.*